May 9, 1950 W. H. BACH 2,506,765
FILM GATE HAVING PROJECTING
PRESSURE RECEIVING ELEMENTS
Filed March 6, 1948 2 Sheets-Sheet 1
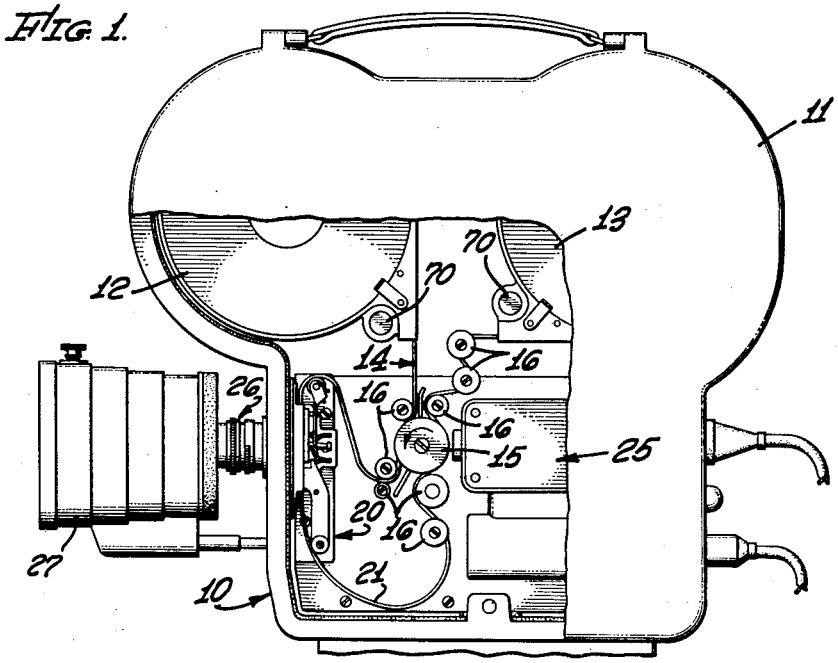
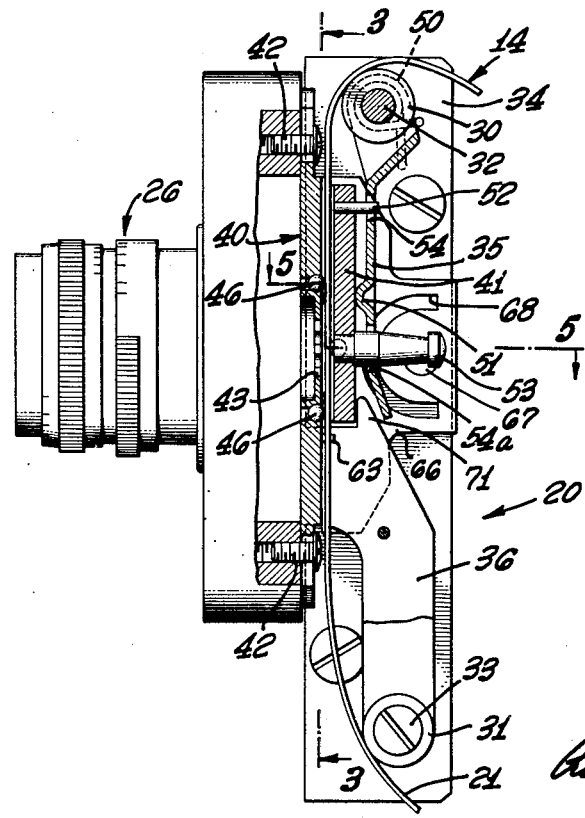
WALTER H. BACH,
INVENTOR.
BY
Robert W. Fulwider
ATTORNEY.

May 9, 1950

W. H. BACH
FILM GATE HAVING PROJECTING
PRESSURE RECEIVING ELEMENTS 2,506,765

Filed March 6, 1948

WALTER H. BACH,
INVENTOR.

BY
Robert W. Fulwider
ATTORNEY.

/ Patented May 9, 1950

2,506,765

UNITED STATES PATENT OFFICE 2,506,765

FILM GATE HAVING PROJECTING PRESSURE RECEIVING ELEMENTS

Walter H. Bach, Los Angeles, Calif., assignor to Berndt-Bach, Incorporated, Los Angeles, Calif., a corporation of California Application March 6, 1948, Serial No. 13,484

4 Claims. (Cl. 88—17)

The present invention relates to the handling of motion picture film and more particularly to the gates used in motion picture cameras and projectors to hold the moving film accurately in the focal plane of the optical system.

Film gates in motion picture cameras and projectors have long presented many problems in manufacturing, operation and maintenance and efforts heretofore have not been fully successful in overcoming these problems. Particularly are these problems present in cameras and projectors designed for use with relatively narrow width film, as for example, 16 millimeter film. The greater difficulties encountered with narrow width film are in large part due to the fact that as the image size on the film is decreased, the necessity for extreme accuracy in positioning the film relative to the projecting or photographing lens increases. Furthermore there is a tendency for the film to curl and thus lie in a curved rather than a flat plane as the frames of the film are successively moved past the lens.

In some instances it has been attempted to hold the film in a substantially planar surface by holding it under tension during the exposure. Such efforts are far from successful due to the fact that the rapid intermittent motion makes it necessary for the film to be free to move through the gate easily and rapidly, otherwise the claw which advances the film tends to rip out the space between the sprocket holes of the film.

Another arrangement used heretofore to hold the film in flat condition includes a flat pressure plate held against the front surface of the film and pressure means spring-urged against the back surface of the film to hold it in sliding contact with the front plate during its motion through the gate. The principal objection to this arrangement for holding the film is that a flat plate against the emulsion surface of the film results in the collection of dust and other foreign matter which in turn produces scratches and streaks in the emulsion surface, and also produces lint and fine shavings of film emulsion which fall into the gate and interfere with the photographic image being produced or projected.

Attempts have been made to drive the front surface of the film against longitudinal rail-like members, but heretofore no materials have been developed for such rails that is adapted to withstand the abrasive effect of the rapidly moving film and avoid the collection of dust and the production of lint and shavings which enter the projection gate.

It is a major object of my invention to provide supporting means for film-handling apparatus which is adapted to bear against the emulsion-bearing surface of the film and hold the same in a plane surface.

It is another object of my invention to provide supporting means as described which does not tend to collect and create dirt, dust and shavings.

It is still another object of my invention to provide a film supporting gate of the class described which is adapted to withstand the abrasive effect of rapidly moving film.

It is a further object of my invention to provide a film gate which is adapted to hold the film in a highly accurate plane surface and yet is economical to manufacture.

I have found that a supporting means in a film gate meeting the foregoing requirements can be constructed with a number of separate substantially point contact elements distributed throughout a supporting surface and having their contact points positioned substantially in a plane. I have found further that by using such separate point contact supporting elements, materials particularly adapted to resist wear can be used for the contact element while the supporting member carrying the contact elements can be constructed of material adapted to withstand mechanical stresses and to maintain a constant and undistorted shape.

A film gate structure in which only the film contacting elements need be hardened to resist abrasion is much simpler to manufacture, is less expensive, and is less subject to damage from mechanical shock both during manufacture and use, than gate members which are constructed of relatively large pieces of hardened steel.

The foregoing and other objects and advantages of my invention will become apparent from the following detailed description of an embodiment thereof in a motion picture camera. The invention is illustrated by accompanying drawings in which:

Figure 1 is a side elevational view of a motion picture camera incorporating my improved film gate, a portion of the camera case being broken away to reveal interior parts;

Figure 2 is an enlarged elevational section of the film gate portion of the camera illustrated in Figure 1;

Figure 3:
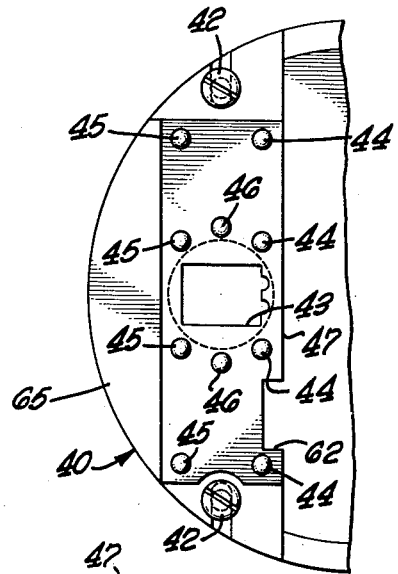
Figure 3 is an enlarged and fragmentary view taken on the line 3—3 in Figure 2.

Referring first to Figure 1, it will be seen that the film gate of the present invention is incorporated in a motion picture camera having a case 10 provided with a hinged cover 11 which may be swung open to reveal a pair of film magazines 12 and 13 which are respectively positioned to supply and take up a motion picture film 14 which is driven by a power sprocket 15.

The film used herein is of the type having perforations in one edge, only, the other edge being left unperforated so as to leave space for a sound track. The film gate embodying my invention is not limited to single perforated film however, but is equally useful for other types of film.

Suitable guide rollers 16 serve to hold the film 14 in proper tension against the drive sprockets 15 in order that it may be driven in the direction indicated by the arrow placed on the sprocket 15 in Figure 1. Thus it will be seen that the film 14 issues from a supply magazine 12, passing in a downward direction past the left hand periphery of the drive sprocket 15, thence around a guide roller 16, and upwardly into the upper entrance of an exposure gate structure indicated generally by the reference character 20. Thence the film passes downwardly through the gate mechanism 20 through a loop 21, past a pair of guide rollers 16 and the right hand side of the drive sprocket 15, around three more guide rollers 16 and into a pickup magazine 13. A recording galvanometer system 25 is positioned to the right of the drive sprocket 15 and adapted to produce an optical sound track on the film 14 as it passes the drive sprocket 15.

The optical system of the camera illustrated in Figure 1 includes the conventional lens 26, protected by a lens hood 27, which focuses a picture image on the film 14 as it passes through the gate mechanism 20. Suitable shutter and intermittent drive mechanism is provided to move the film in the conventional manner and interrupt the optical system, whereby to produce a series of motion picture frames on the film 14 in the manner well-known in the art.

My invention resides in the film pressure members in the gate mechanism 20 and for a detailed description thereof, reference should now be had to Figure 2. In Figure 2 it will be seen that the film 14 in its passage through the gate mechanism 20 runs over a guide roller 30 at the top of the mechanism and a lower guide roller 31. The guide rollers 30 and 31 turn freely on fixed studs 32 and 33 respectively which are secured in a base plate 34 and which also serve as pivots for inwardly swinging arms, one 35 at the top of the mechanism and another 36 at the lower part of the gate mechanism. The purpose of the arms 35 and 36 will be described in detail later herein.

The film is held in operative position relative to the lens 26 between a pair of pressure plates 40 and 41. The forward pressure plate 40 may be termed the fixed pressure plate and is secured to the frame of the camera by a pair of screws 42 as shown in Figure 2 and in Figure 3. The rearward pressure plate 41 has what may be termed a floating action, that is, it is free to assume a position parallel to the film supporting surface established by the forward pressure plate 40, and in spring-urged toward the pressure plate 40 whereby to hold the film in a plane surface with the emulsion surface of the film at the proper focal distance from the optical center of the lens 26.

The exposure of the film 14 takes place through an aperture 43 formed in the forward pressure plate 40, the shape of this aperture being best seen in Figure 3. While the invention described herein is illustrated as embodied in a camera, it will be realized by those skilled in the art that it is of equal advantage in a projector. When the plate 40 is employed in a projector, the images imprinted on the film are projected through the aperture 43.

Again referring to Figure 3, it will be seen that a number of spherical film supporting elements 44, 45 and 46 are mounted in the forward pressure plate 40 and distributed in a certain pattern throughout the surface thereof. Certain of the film supporting elements 44 are arranged in spaced relationship in a vertical line near one edge 47 of the pressure plate 40, other film supporting elements 45 are arranged in another line adjacent the opposite edge of the film 14 and two of the film supporting elements 46 are located on a medial line of the film 14. The right hand (in Figure 3) film supporting elements 44 are so positioned with respect to the film 14 that their line of contact falls between the perforations in the film and the right hand edge of the aperture 43 whereby any slight abrasion of the film which may result from the contact thereof with the elements 44 takes place in an area outside of the picture area but inside the line of perforations. The other vertical line of film contacting or pressure elements 45 is so positioned that the line of contact falls between the picture area and the edge area on which the sound track is recorded. Thus any slight abrasion which is produced by the elements 45 does not disturb either the picture area or the sound track.

Figure 5:
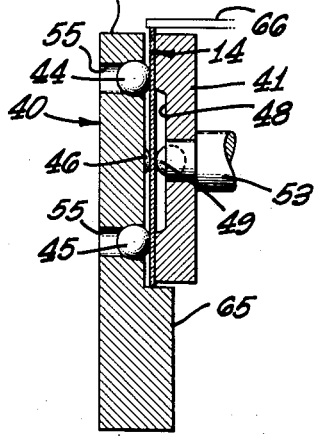
Figure 5 is an enlarged plan section taken on the line 5—5 in Figure 2.

While the central pressure elements 46 are so positioned that if they were maintained in substantial pressure contact with the film they might tend to produce a central striation therein, it will be noticed from an examination of Figure 5 that the rear pressure plate 41 with which pressure is applied to the film 14 is relieved on its film-adjacent surface by a width approximately equal to the width of the aperture 43. This front surface relief of the plate 41 is indicated by the reference character 48. Thus with the exception of the single ball 49, no pressure is applied to the film adjacent the central contacting elements 46 which therefore serve only as guides which may intermittently contact the film to prevent it from curling forwardly out of the focal plane established by the contacting elements.

One of the characteristics commonly noted in motion picture film is its tendency to curl along an arc running transversely of the film. The amount of curvature thus produced is dependent to a large extent on the humidity, and on damp days this curvature becomes quite pronouced in one direction, and on dry days the curvature is reduced sometimes even reversing its direction.

As has been above stated, the centrally located ball 46 in the front pressure plate prevents the film from curling forwardly. In order to additionally secure the film against rearward curling at the point in the gate mechanism opposite the exposure aperture 43, a single ball 49 is mounted in the rear pressure plate 41 and is located approximately on the optical axis immediately behind the aperture 43.

The rear pressure plate 41 is provided with a rearwardly extending handle 53 having an axis coincident with the location of the rear pressure receiving ball 49. Thus it is convenient to mount the rear pressure receiving ball 49 in the handle itself which in turn is pressed into the rear pressure plate 41.

Under normal atmospheric conditions, the characteristic curvature of the film is slightly convex on the back or non-emulsion side and slightly concave on the emulsion surface. This characteristic disposition of the film, it will be seen, causes it to tend to remain in sliding contact with the rear pressure receiving ball 49 as it moves through the mechanism and to stay out of contact with the forward and centrally located pressure receiving balls 46. This is as it should be, since the emulsion surface of the film is more subject to damage from frictional contact than is the rear, uncoated surface of the film.

As has been earlier stated, it is desired to maintain the film in intimate contact with the supporting elements 44, 45 and 46 as it moves through the gate mechanism 20. To this end the rear pressure plate is spring-urged forwardly against the forward pressure plate 40. This is accomplished by providing a torsion spring 50 surrounding the upper pivot 32, anchored in the base plate 34 and bent up so as to engage the upper arm 35 and cause same to rotate in a clockwise direction about the pivot 32 as viewed in Figure 2.

The arm 35 is provided with a forwardly projecting extrusion 51 which is so positioned as to contact the rear pressure plate 41 at approximately its center so as to effect an even distribution of the forward pressure thereof produced by the torsion spring 50. The rear pressure plate 41 is provided with a rearwardly projecting pin 52 and the rearwardly projecting handle 53 which project through suitably positioned apertures 54 and 54a respectively, in the rear plate 41, thus serving to limit the floating action of the plate 41 and also providing for manual withdrawal thereof to enable the film to be threaded through the gate mechanism 20 when loading the camera.

As has been earlier stated, it is highly desirable that the plane established by the pressure receiving elements 44, 45 and 46 be extremely accurate, that is, the deviation from the perfect theoretical plane surface must be as small as possible. This accurate plane surface is achieved by first pressing the individual pressure receiving elements 44, 45 and 46 into sockets 55, in the forward pressure plate 40 and then lapping the projecting elements against an accurate flat surface. I have found that if the sockets 55 are formed as drilled holes having a diameter slightly less than the spherical pressure receiving elements 44, 45 and 46, the pressure receiving elements may then be pressed into the sockets and will be held securely therein. While various materials are suitable for the construction of the parts disclosed herein, I have found that half-hard brass is a particularly suitable material from which to construct the pressure plate 40 while hardened chrome steel balls such as are used in miniature ball bearings are found to be suitable for the pressure receiving elements 44, 45 and 46. By the use of assembly fixtures such as are well-known in the art, the balls or pressure receiving elements 44, 45 and 46 may be pressed into the sockets 55 to an accurately controlled depth whereby to establish a fairly accurate plane surface of contact points prior to the lapping operation above referred to. Due to the relatively malleable nature of the brass plate 40, a small ridge or shoulder 55a (Figure 6) is rolled up ahead of a ball 46, etc., as it is pressed into the plate. This ridge 55a together with the tendency of the brass to cold flow around the ball holds the latter securely in the position shown in Figure 6.

Figure 6:
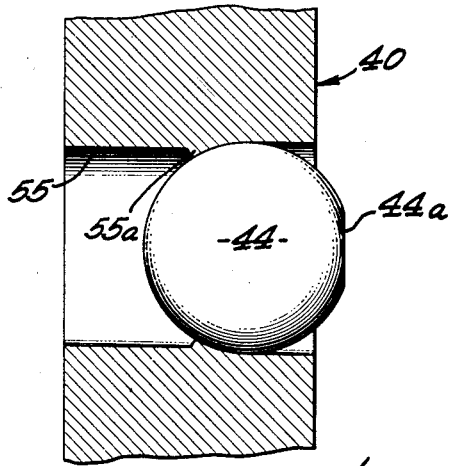
Figure 6 is a greatly enlarged section taken on the line 5—5 in Figure 2, and illustrating a single pressure receiving element of the film pressure member illustrated in Figure 4.

After the elements 44, 45 and 46 have been pressed into the plate as just stated, a few strokes on a lapping plate using an abrasive such as ferric oxide, slightly flattens the projecting surface of the pressure element, producing a shape shown in somewhat exaggerated form in Figure 6. It will be realized, of course, that due to the extreme magnification of the drawings, the small flat surface 44a can be considered as substantially a point contact insofar as its frictional action against the film surface is concerned.

Figure 7:
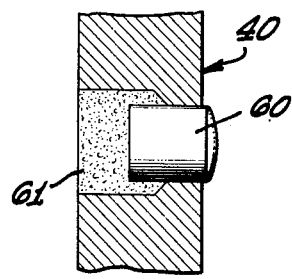
Figure 7 is an enlarged view similar to Figure 6, but illustrating a modified pressure receiving element such as may be incorporated in a film pressure receiving member such as that illustrated in Figure 4.

An alternate form of film pressure receiving element is shown in Figure 7 and indicated by the reference character 60. The pressure receiving element 60 consists of a small cylindrical block of synthetic sapphire or other anti-friction jewel material having a slightly rounded protruding surface and a cylindrical shank secured in the pressure plate 40. The securing of a jewel element 60 is best achieved by counter-boring the plate 40 from the surface opposite the friction surface and filling such counter-bores with jewel-setting cement as is indicated by the numeral 61 in Figure 7.

If desired, the jewels 60 which are distributed in the same pattern as the elements 44, 45 and 46 may also be lapped to bring all the contact points into a common plane.

Figure 4:
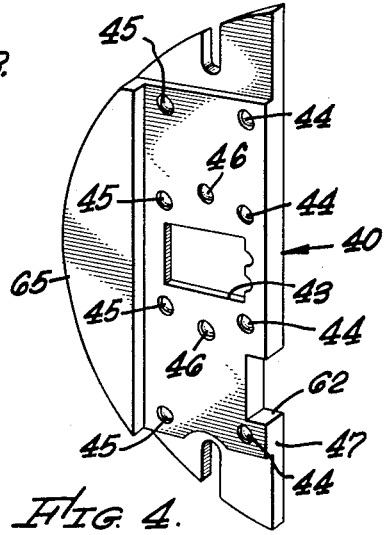
Figure 4 is a perspective view of a film pressure receiving element illustrated in elevation in Figure 3.

The forward pressure plate 40 is formed with a small recess in the right hand edge 47 as can be seen in Figures 3 and 4, and which is identified by the reference character 62. The purpose of the recess 62 is to provide clearance for a pull-down claw 63 which projects rearwardly through the perforations of the film as best seen in Figure 2. To hold the film 14 in operative relationship to the pull-down claw 63, the lower arm 36 is spring-urged in counter-clockwise rotation by a torsion spring (not shown) similar to the torsion spring 50 employed in connection with the upper arm 35. The lower arm 36 is comprised of a pair of identical spaced apart plates which straddle the pull-down claw 63, thus to provide clearance behind the film 14 into which the claw 63 can project.

The film is guided laterally by a raised portion 65 in the forward pressure plate 40 which guides the left hand edge of the film as viewed in Figure 3, and a side pressure spring 66 which is secured to the base plate 34 by a single screw 67. An arcuate slot 68 is cut out of the pressure plate 66 surrounding the mounting screw 67 whereby the plate 66 can be deformed slightly to spring-urge the film 14 against the raised portion 65 of the plate 40 as can be seen in Figure 5.

In loading the camera, the two magazines are secured in place by a pair of knurled attachment screws 70 and a suitable loop of film is drawn out of the supply reel 12. The rearward pressure plate 41 is drawn back, using the previously described handle 53. As the plate 41 is drawn back, it will be noted that its lower end catches under a lug 71 formed in the upper end of the arm 36 whereby to simultaneously withdraw the lower arm 36. With the pressure plate 41 and the arm 36 thus held back, the film may be slid edgewise into its position within the gate mechanism 20 and the rear pressure plate released, whereby to force the film 14 up against the pressure receiving elements in the forward pressure plate 40.

The balance of the threading operation is similar to that of other cameras and projectors, and since such operations are well-known in the art, they need not be described herein. Upon closing the lid 11 and securing same, the camera is now ready to operate. It will be noted that the film is held in approximately equal pressure contact with all the elements 44 and 45, whereby the wear is evenly distributed throughout such pressure receiving elements. Thus, while the elements wear somewhat over a long period of use, the wearing away of the pressure contact points takes place substantially equally on all of them, and the plane surface is not disturbed. Due to the extremely small area of contact of the elements 44, 45 and 46, the resistance to passage of the film is relatively slight, thus greatly reducing the likelihood that the spaces between perforations will be torn out by the pull-down claw 63. Furthermore, since the contact areas are so small, there is practically no tendency to collect lint or dust in the manner in which such foreign material collects in conventional gates. Still further, the tendency for foreign matter to collect in the gate mechanism and abrade the film as it passes therethrough is materially reduced in the film gate described herein. Since there is a small space between the actual film-adjacent surface of the forward pressure plate 40 and the emulsion surface of the film itself, any foreign matter on the surface of the film will pass completely through the gate and will not be caught against the gate, collected, and directed into the exposure aperture.

While the gate mechanisms shown and described herein are fully capable of achieving the objects and providing the advantages herein before stated, it is realized that the devices may be modified considerably by those skilled in the art without departing from the spirit of the invention. Therefore I do not mean to be limited in the forms shown and described herein, but rather to the scope of the appended claims.

I claim:

1. In motion picture apparatus of the class described, a film pressure plate comprising in combination: a base member having a lateral film guiding shoulder formed therein, and an optical aperture formed therein adapted to expose a picture frame area of said film when the latter is positioned against said lateral guide shoulder, and a plurality of sockets formed in said member adjacent the edges of said aperture; a spring-urged guide member opposite said shoulder adapted to guide said film in sliding motion between said shoulder and said spring-urged member past said aperture; a plurality of relatively hard pressure receiving elements secured in said sockets, said pressure receiving elements projecting from said base member whereby to support said film for sliding motion in a plane spaced from said base member for exposure of said film through said aperture.

2. In motion picture apparatus of the class described, a film pressure plate comprising in combination: a base member having a lateral film guiding shoulder formed therein, an optical aperture formed therein adapted to expose a picture frame area of said film when the latter is positioned against said lateral guide shoulder and a plurality of sockets arranged in a pattern around said aperture; a spring-urged guide member opposite said shoulder adapted to guide said film in sliding motion between said shoulder and said spring-urged member past said aperture; a plurality of relatively hard pressure receiving elements secured in said sockets, said pressure receiving elements having curved surfaces projecting from said base member and tangent to a common plane whereby to support said film for sliding motion in said plane for exposure of said film through said aperture; and a backing plate positioned on the opposite side of said film from said base member and adjacent said aperture, said backing plate being adapted to urge said film into sliding pressure contact with said pressure receiving members whereby to hold same in said plane.

3. In motion picture apparatus of the class described, a film gate mechanism comprising in combination: a base member having a lateral film guide shoulder formed therein, and an optical aperture positioned therein adapted to expose picture frame areas in said film when the same is positioned against said shoulder; a spring-urged edge guide opposite said shoulder adapted to hold said film against said shoulder for sliding motion past said aperture; a plurality of pressure receiving elements secured in said base member, and having contact points thereof arranged in a plane whereby to support said film in an accurate focal plane spaced from said base member and adjacent said aperture, said pressure receiving elements being arranged in said base member in a pattern whereby certain of said pressure receiving elements contact said film at spaced points along a vertical line positioned between a picture area and perforations in said film, others of said pressure receiving elements contact said film at spaced points along a vertical line between said picture area and a sound track area in said film; a floating backing plate positioned on the opposite side of said film from said aperture, said backing plate being centrally relieved whereby to apply backing pressure to said film adjacent said vertical lines of pressure receiving elements, said backing plate being mounted for floating motion whereby to assume a position parallel to said plane established by said pressure receiving elements; and spring means positioned to contact said backing plate at approximately the center thereof, said spring means being further positioned and adapted to urge said backing plate forwardly against said film whereby to hold same in said plane.

4. In motion picture apparatus of the class described, a film gate mechanism comprising in combination: a base member having a lateral film guide shoulder formed therein, and an optical aperture positioned therein adapted to expose picture frame areas in said film when the same is positioned against said shoulder; a spring-urged edge guide opposite said shoulder adapted to hold said film against said shoulder for sliding motion past said aperture; a plurality of pressure receiving elements secured in said base member, and having contact points thereof arranged in a plane whereby to support said film in an accurate focal plane spaced from said base member and adjacent said aperture, said pressure receiving elements being arranged in said base member in a pattern whereby certain of said pressure receiving elements contact said film at spaced points along a vertical line positioned between a picture area and perforations in said film, others of said pressure receiving elements contact said film at spaced points along a vertical line between said picture area and a sound track area in said film; a floating backing plate positioned on the opposite side of said film from said aperture, said backing plate being centrally relieved whereby to apply backing pressure to said film adjacent said vertical lines of pressure receiving elements, said backing plate being mounted for floating motion whereby to assume a position parallel to said plane established by said pressure receiving elements; a single, substantially point contact pressure receiving element secured in said backing plate opposite said aperture, positioned and adapted to prevent rearward curling of said film as it passes through said gate mechanism; and spring means positioned to contact said backing plate at approximately the center thereof, said spring means being further positioned and adapted to urge said backing plate forwardly against said film whereby to hold same in said plane.

WALTER H. BACH.

REFERENCES CITED

The following references are of record in the file of this patent:

UNITED STATES PATENTS

| Number | Name | Date |
| --- | --- | --- |
| 1,074,177 | Huntoon | Sept. 30, 1913 |
| 1,957,904 | Ord | May 8, 1934 |
| 2,010,569 | Sitzler | Aug. 6, 1935 |
| 2,057,553 | Boecking | Oct. 13, 1936 |
| 2,277,695 | Foster | Mar. 31, 1942 |
| 2,326,283 | Bonsall | Aug. 10, 1943 |
| 2,350,780 | Lechleitner | June 6, 1944 |
| 2,414,598 | Klipper | Jan. 21, 1947 |

FOREIGN PATENTS

| Number | Country | Date |
| --- | --- | --- |
| 131,708 | Austria | Feb. 10, 1933 |